W. Grover.
Counting Attachment for Thread-Winding Machine.
Nº 74,911.   Sheet 1- 4 Sheets.
Patented Feb. 25, 1868.
Fig: 1.
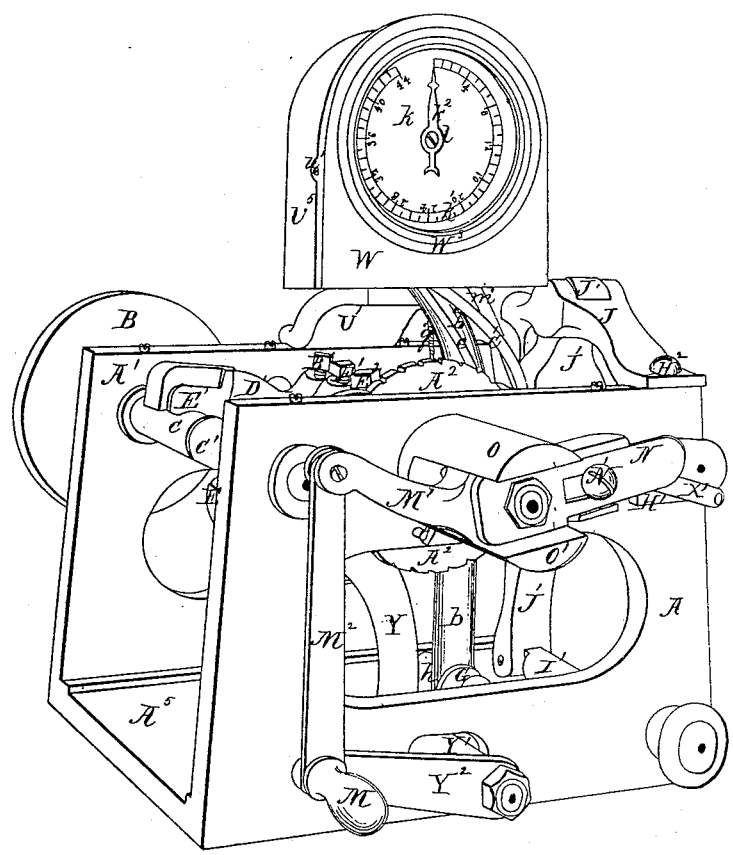
Witnesses.
J P Buckland
T. A. Curtis
Inventor.
Wm Grover

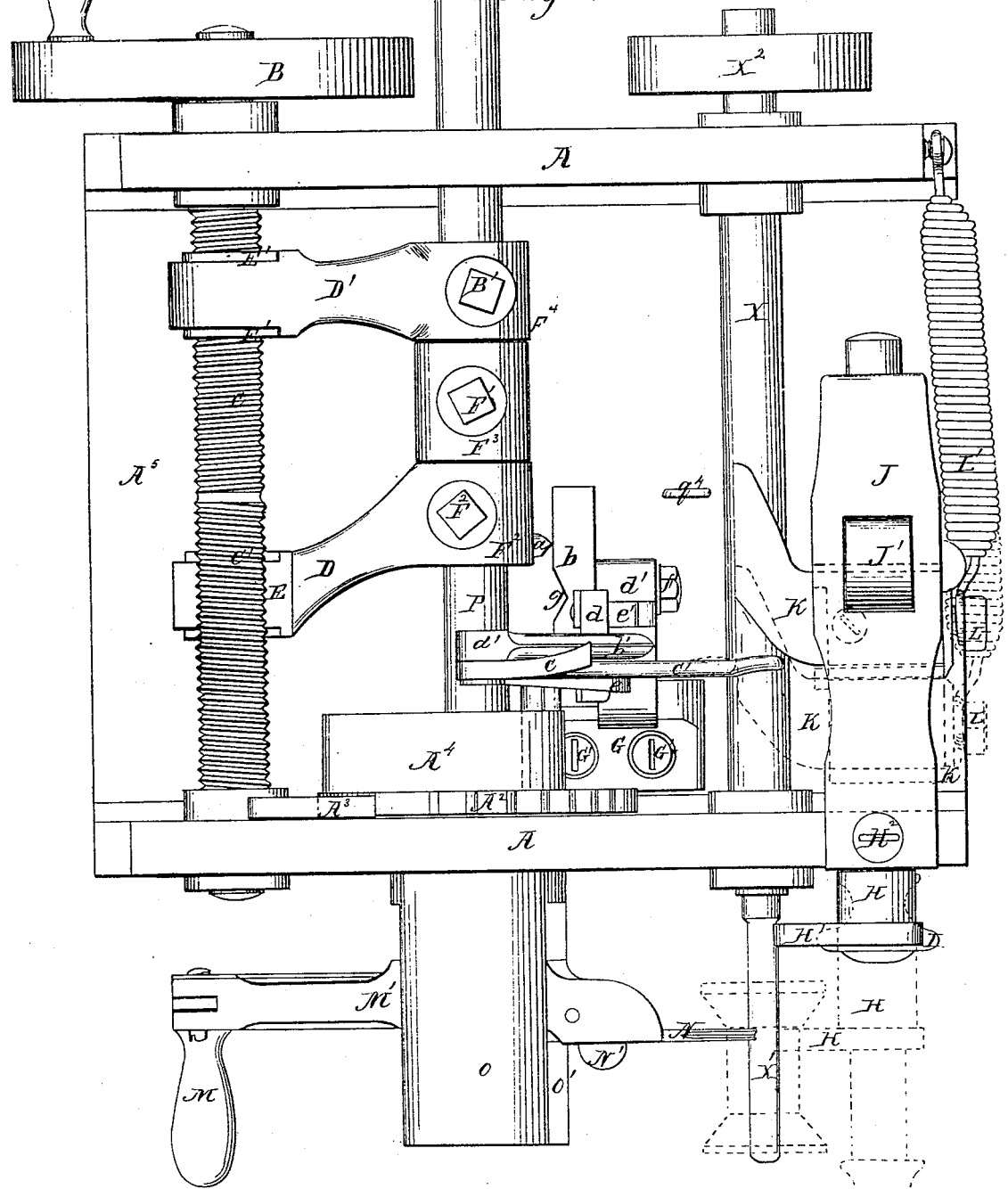

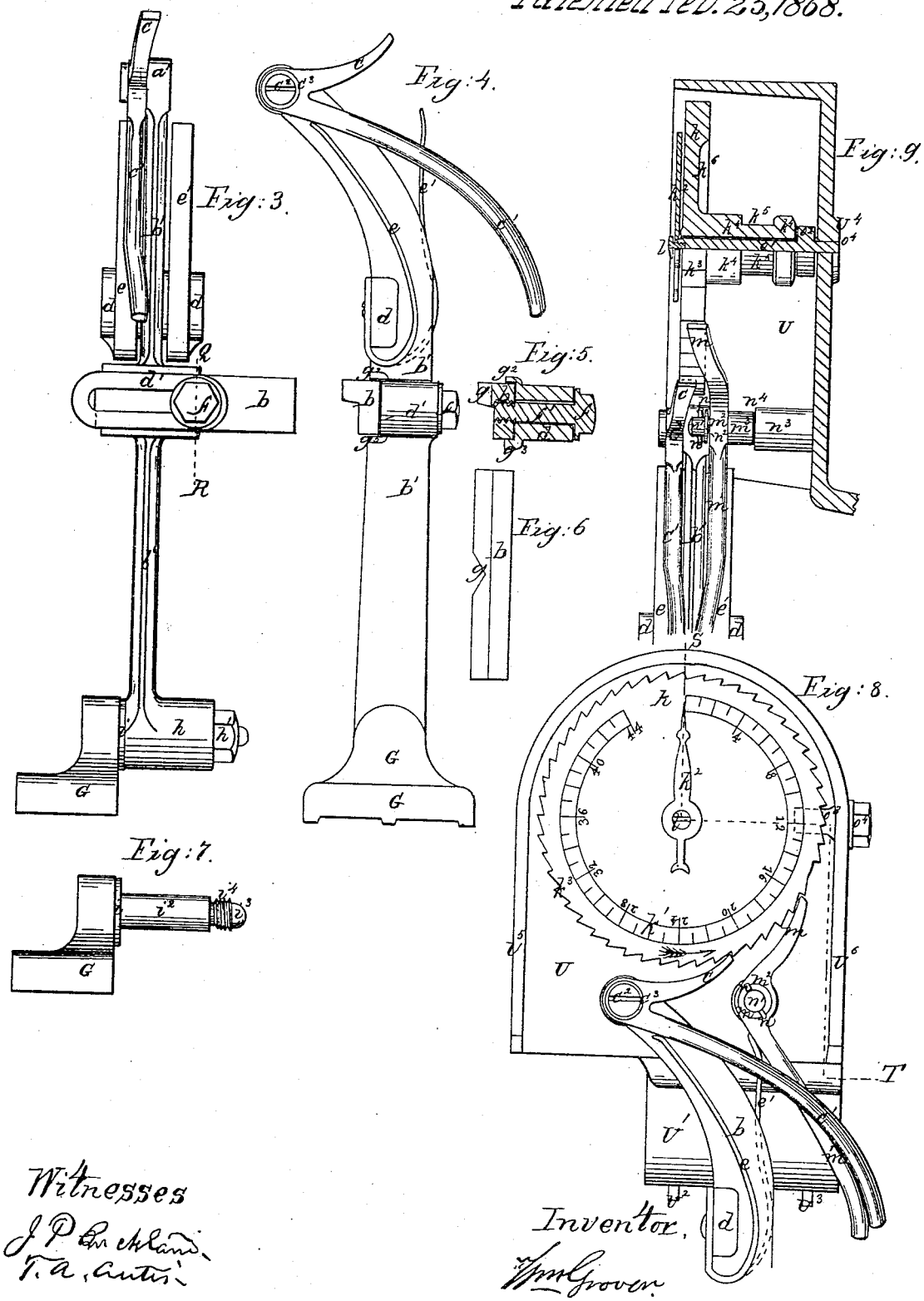

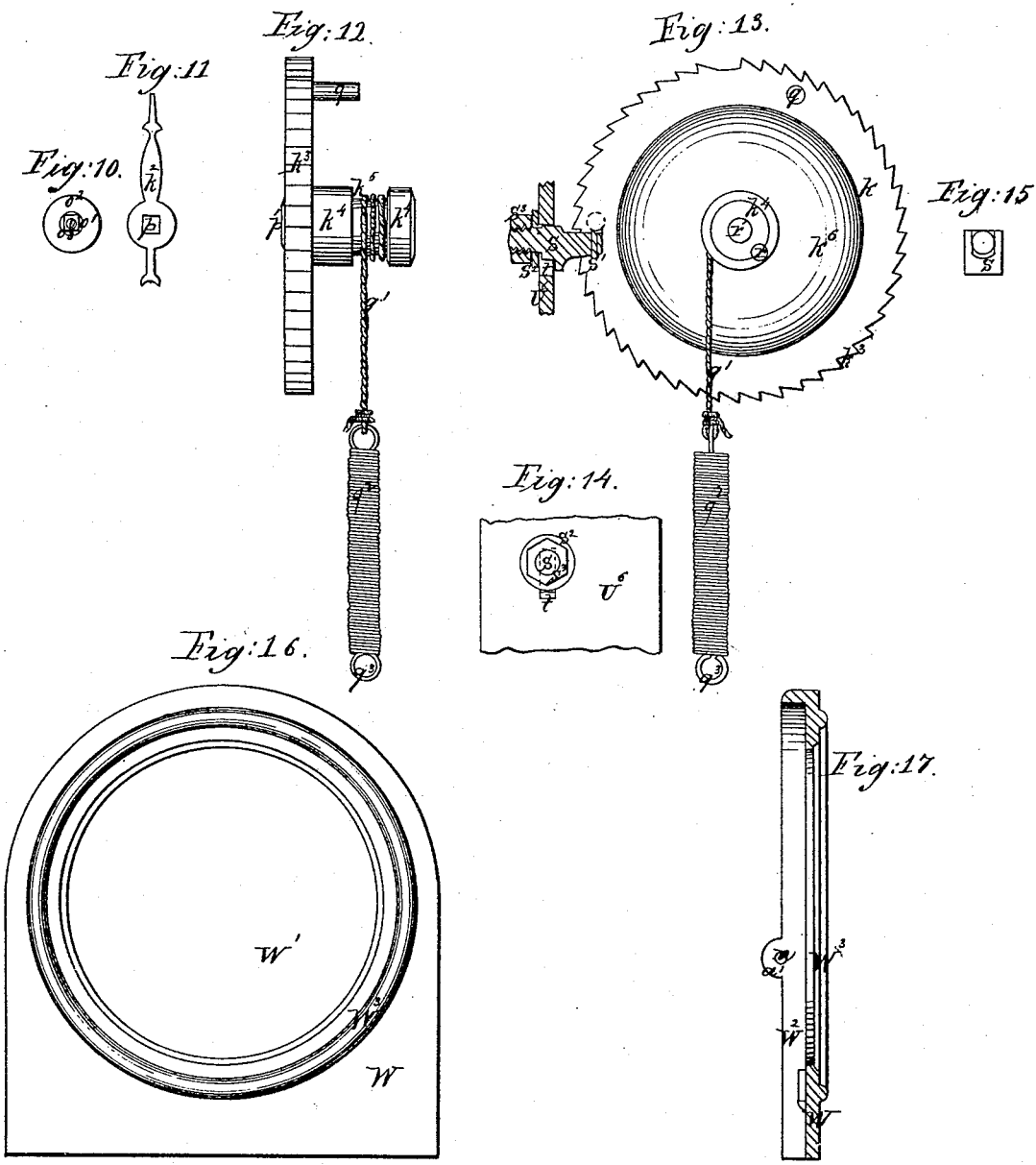

United States Patent Office.

WILLIAM GROVER, OF HOLYOKE, MASSACHUSETTS.

Letters Patent No. 74,911, dated February 25, 1868.

IMPROVEMENT IN COUNTING-ATTACHMENT FOR THREAD-WINDING MACHINES.

The Schedule referred to in these Letters Patent and making part of the same.

TO ALL WHOM IT MAY CONCERN:

Be it known that I, WILLIAM GROVER, of Holyoke, in the county of Hampden, and Commonwealth of Massachusetts, have invented a new and improved Counting-Attachment for Thread-Winding Machines; and I do hereby declare that the following is a full and exact description thereof, reference being had to the annexed drawings, which make a part of this specification, and to the letters and figures of reference marked thereon.

My invention relates to a counting-attachment, which indicates, by the revolution of a graduated dial or an index, the number of layers of thread wound upon a spool or bobbin in thread-winding machines of a certain class, the general construction and arrangement of which machines it is necessary for me to describe briefly, inasmuch as said counting-attachment is operated by such winding-machines, and made a part thereof.

In the class of winding-machines to which my invention is designed to be applied, the thread is drawn from a bobbin or reel by the rotation of the spool upon which it is to be wound, and is distributed upon the spool in closely-wound layers by a thread-guide, which has a traverse motion, the layers of thread running alternately from one end of the spool to the other. The traverse motion is imparted to the thread-guide by means of a revolving screw-shaft, having right and left-handed screw-threads cut upon corresponding portions of it, between its bearings. These screw-threads work into segments of nuts, of brass or other soft metal, each segment being fitted to engage with one of the reversed screw-threads upon the shaft. The segments are rigidly connected by set-screws and arms to a sliding shaft, in such a relative position that, when one segment is in contact with the screw-shaft, the other will be disengaged, and thus, by bringing the segments alternately in contact with the revolving screw-shaft, a traverse motion will be imparted to the sliding shaft to which the segments of nuts are attached, and to the thread-guide, which is fastened to the end of the sliding shaft, and the guide can therefore be made to traverse from end to end of the spool which is being wound. When the thread has been wound up to one shoulder of the spool, the operator, by an arrangement of a winch and levers, is enabled, by a slight motion of the hand, to disengage the segmental nut, which has been controlling the motion of the thread-guide in one direction, and to bring the other segment in contact with the reverse screw-thread, and thus cause the thread-guide to retrograde and distribute a layer of thread up to the opposite shoulder of the spool, and this operation is continued until the spool is full. The relative speed of the screw-shaft and of the spool-spindle is capable of being regulated so that the thread-guide will traverse at the precise rate of speed necessary to deposit the thread in closely-wound layers, whether it is finer or coarser. The spool is forced from the spool-spindle, when wound, by the pressure of a detaching-plate or finger, which is attached to a shaft operated by a draw-lever, under the control of the operator. The operation of the registering-dial or index in the said counting-attachment is controlled by the motion of the traversing-shaft of the winding-machine; and I also use the reciprocating motion of the rod which operates the detaching-finger, to liberate the dial or index, after a spool has been wound, so that it is free to be readjusted for the next registering. My invention can, therefore, be readily applied to all thread-winding machines in which a traverse motion of any of the operative parts can be used to impart motion to a counting-attachment or indicator. In the drawings before referred to—

Figure 1, plate 1, is a perspective view of a thread-winding machine with said counting-attachment applied thereto.

In plate 2—

Figure 2 is a plan view of the same machine, the case of the counting-attachment and parts attached to the case being removed.

In plate 3—

Figure 3 is an elevation of a vibrating-arm, which is hinged to a foot attached to the base of the thread-winding machine, and also of the foot, and the parts attached to the vibrating-arm.

Figure 4 is another elevation of the same.

Figure 5 is a vertical section through the line Q R, fig. 3.

Figure 6 is a plan of the notched plate *b*, which is fastened to the vibrating-arm.

Figure 7 is an elevation of the foot, which is bolted to the base of the winding-machine, and supports the vibrating-arm.

Figure 8 is an elevation of the upper portion of the counting-attachment, (the glass front plate of the dial-case and its frame being removed.)

Figure 9 is a transverse section through the line S T, fig. 8.

In plate 4—

Figure 10 is an end view of the spindle upon which the graduated wheel revolves.

Figure 11 is an elevation of the index.

Figure 12 is a side elevation of the graduated indicating-wheel and its spindle, and the cord and tension-spring attached thereto.

Figure 13 is an elevation of the same, showing, also, the screw-stop attached to the case.

Figure 14 is a view of a portion of the exterior of the dial-case, showing said stop.

Figure 15 is an end view of said stop.

Figure 16 is a front elevation of the frame which is applied to the front of the dial-case, for securing the glass plate which protects the dial, and Figure 17 is a transverse vertical section of the same.

In the thread-winding machine to which my invention is represented as attached, and of which it is made a part, (plates 1 and 2,) the bearings of the screw-shaft, sliding shaft P, and spool-spindle X are formed in the sides A A' of the machine. The right and left-handed screw-threads C C' are cut upon the screw-shaft, which is moved by power applied to the pulley B, the speed of which is regulated by a system of cone-pulleys, connected with the spool-shaft X, to which the power is first applied.

The segmental nut E is attached to the arm D, which is fastened rigidly at the proper point upon the sliding shaft by the set-screw $E^2$, turning in the hub $F^2$, and bearing against the shaft. The other segmental nut $E^1$ is in like manner attached to the arm D', fastened upon the shaft P by the set-screw B'. The nuts are adjusted to meet the opposite sides of the shaft, and in such relative position to one another that only one nut will be engaged with the screw-thread upon the shaft at the same time.

By means of the handle M, strap $Y^2$, stud $Y^1$, and arm Y, attached rigidly to the sliding shaft by the set-screw $F^1$, in the hub $F^3$, the shaft P can be turned so as to bring either segmental nut into action, and impart an advancing or retrograde motion to the sliding shaft and thread-guide N, the guide being made to press more or less firmly upon the layers of thread by the action of the volute spring $A^4$, and ratchet-wheel and pawl $A^2$ and $A^3$.

X' is the spool-spindle, from which the spool, when wound, is pressed off by the plate or finger H', at the end of the shaft H, which is made to advance by an arrangement of levers, and retracted by the spring L', an advanced position of the detaching-plate H', and the parts operating with reference to it, being shown in red lines, (plate 2.)

To apply my invention to a winding-machine constructed as above described, the only parts of the counting-attachment which are attached directly to any of the operative parts of the machine are the stud $a$, screwed firmly into the hub of one of the arms, and the curved releasing-plate K, bolted to the shaft H.

In setting forth the construction of my invention, I will first describe the dial-case and dial, and the parts immediately attached thereto; then the vibrating-arm, and the parts connected with such arm; and lastly, the parts which are applied to the winding-machine directly, (the stud $a$ and plate K,) to communicate motion to and operate the whole counting-attachment.

A dial-case, U, having the front covered by the frame W and glass plate W', is supported above the winding-machine, in full view of the operator, by the bracket $U^1$, fastened to the rear side of the winding-machine by dowel-pins $U^2 U^3$, and a screw-bolt. The indicating-dial turns upon a spindle, $o^1$, projecting from the back of the dial-case. The front end of the spindle is made of proper shape to enter the rectangular opening, $p$, in the index $k^2$, which is made fast upon the spindle, and set so as to point vertically upward, or to the starting-point of the graduation upon the dial, however the latter may be set. Teeth $k^3$ are cut upon the edge of the dial-plate, being at least as many in number as the layers of thread to be wound upon the spools.

To prevent the dial from making more than one revolution, and thereby disarranging the counting-attachment, one tooth is left blank, so that if the winding-machinery is operated after a certain number of traverses of the thread-guide have been made, the pawl which revolves the dial will work in the blank space of the omitted tooth, and will not further move the dial. The hollow shaft of the dial-plate turns upon the spindle $o^1$, and extends from the reverse side of the dial to the shoulder $o^2$ of the spindle, and a groove is formed in it, at $k^5$, in which a cord, $q^1$, fig. 13, attached to a tension-spring, $q^2$, (or an equivalent weight,) is wound, for restoring the dial to its place after each spool is removed from the machine. The lower end of the spring is fastened to an eye, $q^4$, set in the base of the winding-machine. The dial is made to revolve in the direction indicated by the curved arrow, and to prevent it, when released, from revolving too far in the opposite direction by the draught of the tension-spring, a pin, $q$, is inserted in the back of the dial-plate, which comes in contact with the adjustable stop $s$, projecting into the dial-case through the slot $t$, in the side $U^6$.

To deaden the blow of the pin $q$ upon the stop $s$, when the dial is released and turns suddenly back to place, a pad of leather, $s^1$, is attached to the stop. Any wear of the parts may be compensated for by moving the stop $s$ upward or downward in the slot $t$, to a point where it will check the revolution of the dial when the index points to the first mark of graduation, and at this point the stop is secured by the nut $s^3$. The slot $t$ is also made of sufficient length to allow the stop to be lowered to a point where it will allow the first mark of graduation on the dial to move the length of one space past the index, when the latter points vertically upward, so that the dial can be moved forward one space before the index points to such first mark or starting-point of the graduation, which adjustment will be employed when the number of layers of thread to be wound is uneven.

The frame W, containing the glass plate W', is fastened to the dial-case by the screws $u$ passing through the lugs $u'$ into the sides of the case. The dial-plate thus set in the case, and supported above the machine, is caused to revolve as an ordinary ratchet-wheel by means of a pawl, $c$, and is held in place, after being moved forward, by another pawl, $m$, which, from its operation, I denominate a detent. The detent turns upon a stud, $n'$, screwed into the back of the dial-case, and has a curved arm, $m'$, extending below the stud, which arm is moved by the releasing-plate or tripper, when the spool is dislodged from the spool-spindle, and disengages the detent from the teeth of the dial-plate.

The vibrating-arm $b'$, and parts attached to it, are constructed as follows: The arm $b'$ is of the form shown in figs. 3 and 4, and a cylindrical opening in the enlarged portion, $h$, receives the pin $i^2$, which projects from the foot G, the latter being bolted firmly to the base of the winding-machine. By means of the screw-thread $i^4$ and nut $h'$, the arm is brought against the collar $i$ of the foot, and any lateral play of the arm is prevented, while it can be turned about the pin $i^2$, as a centre, to and from the traversing-shaft, P, of the machine. The actuating-pawl, $c$, is pivoted to the upper part of the vibrating-arm $b'$ by the screw $e^2$, about which it turns freely; and it has also a curved arm, $c'$, extending below the pivot, to be used in disengaging the pawl in the same manner as the pawl $m$ is withdrawn. Lateral projections, $d\ d$, are formed upon the vibrating-arm, to which the lower ends of the curved springs $e\ e^1$ are fastened by screws. The upper end of the spring $e$ bears against the curved arm $c'$ of the pawl $c$, to press it closely against the toothed edge of the dial-wheel, and the spring $e$ acts in like manner upon the arm of the detent $m$. The latter spring also serves to press the vibrating-arm to the left of the machine, or towards the traversing-shaft, and should be made of sufficient stiffness to exert a constant pressure of the arm in that direction. The notched plate $b$ is a part of the counting-attachment, which is directly coactive with the traversing-shaft of the winding-machine, and is an important part of my invention. It is made of steel, of a length exceeding the limit of the traverse of the shaft P. An angular notch, $g$, is cut at the middle point of the length of the plate, the width of the notch being less than the length of the shortest layer of thread to be wound. The plate is fastened to the arm by the bolt $f'$, which screws into it. To enable the operator to set the plate and notch at the proper point in the width of the machine, a slot is formed in the enlarged part, $d'$, of the arm, along which slot the bolt $f'$ is moved, as may be necessary, to bring the notch to the proper place, and the plate is then clamped to the arm by turning in the screw-bolt $f'$, by means of the head $f$. Guides $g^2\ g^3$ prevent any rotary movement of the plate about the screw-bolt as a centre.

The steel stud $a$, the opposite sides of which are ground off at an angle, as shown in plate 2, is screwed firmly into the hub $F^2$ of the arm D, but may be inserted in any part having the traverse motion of the thread-guide, the position of other parts of the counting-attachment being changed accordingly. The curved steel plate K, which acts to release the pawls when the spool is removed from the machine, is screwed to the sliding rod H, the shape of the edge of the plate being such as to press back the arms of the pawls without crowding them forward.

If the foot G and vibrating-arm are fastened in place, the pawls $c$ and $m$ will engage with the teeth upon the edge of the dial-plate $k$, being held in place against the teeth by the springs $e$ and $e^1$. If the index be now set vertically, and the dial adjusted so that the index points to the first mark of graduation, (or to a point past such first mark in the case of an uneven number of layers,) the counting-attachment is in readiness to be operated in combination with the winding-machine.

A spool is thrust firmly upon the spool-spindle, and the end of the thread attached to it at one or the other shoulder—at the shoulder nearer the operator if an uneven number of layers is to be wound, and at the other shoulder if an even number is required, as the last layer always ends at that shoulder of the spool which is next to the machine, for convenience in fastening the end. As the arm $b'$ is constantly pressed toward the traversing-shaft P, by the action of the spring $e^1$, the plate $b$ will be made to bear continually against the end of the stud $a$, which is, of course, traversing with the hub in which it is inserted, and will, therefore, traverse and retraverse along the plate $b$, as long as the winding continues. When the end of the stud arrives at the edge of the notch $g$, and enters it, it is evident that the plate $b$ will move towards the traversing-shaft as far as the depth of the notch will allow, and that, when the end of the stud moves beyond the angle of the notch, it will begin to press back the plate $b$, and continue to move it back until the stud has passed out of and beyond the notch, when the plate will have resumed its original position. This operation being repeated at every traverse of the stud, the plate and the upper part of the vibrating-arm $b'$ will have a slight reciprocating motion to and from the traversing-shaft. As the detent $m$ is independent of the vibrating-arm, it will prevent the dial from turning backward, and take up any additional motion in the direction of the arrow. When the stud $a$ enters the notch in the plate, and allows the vibrating-arm to move towards the left, the pawl $c$, attached to the arm, will move in the same direction, and the depth of the notch is made sufficient to allow the pawl to move past one tooth of the dial-plate, and bear against the opposite side of it. As the stud meets the opposite side of the notch, it presses back the vibrating-arm and the pawl $c$, which latter will, therefore, revolve the dial in the direction of the arrow a distance equal to the space occupied by one tooth on the periphery of the dial. With each traverse motion of the thread-guide from one shoulder of the spool to the other, it will be seen that the pawl $c$ will take hold of a new tooth upon the dial, and cause the latter to revolve a certain distance. The graduation upon the face of the dial is made to correspond with the length of one forward movement of the dial, so that, at each traverse movement of the stud $a$, the index will point to the next division line upon the dial.

Instead of a dial revolving behind a fixed index, as shown, I have constructed and arranged the indicating parts attached to the dial-case U, in such manner that the index was made to revolve while the dial remained stationary, the construction and operation of the last-described device being substantially the same as that already set forth.

It will be seen that the plate $b$ can be made long enough to allow spools of any length suitable for the machine to be wound thereon, and the layers of thread upon them to be indicated, although, from the usual form of the shoulders of spools, each successive layer is slightly longer than the one beneath it; and that very short spools can also be wound and the layers thereon registered, as the counting-attachment will operate successfully if the stud only traverses from one edge of the notch completely to the opposite edge, or a distance equal to the full width of the notch, the plate $b$ being properly set upon the vibrating-arm, and by making the other parts to correspond, the width of the notch, as shown, might be lessened.

Although the attachment will indicate if the stud enters and leaves the notch at any point in its traverse, it is desirable that the stud should meet the angle of the notch at about the middle point of its movement, which may be effected by moving the plate laterally upon the vibrating-arm to the proper point. In winding very short spools, which would require but a limited traverse of the thread-guide and stud, it is desirable to use a spool-spindle, having a shoulder against which the end of the spool may press, and having also wings or other devices to hold the spool in place against the shoulder, in order that every spool may occupy the same position relatively to the plate $b$, when the latter is properly adjusted upon the vibrating-arm.

The attachment described is constructed to register any number of layers of thread up to forty-four, and the number and size of teeth upon the edge of the dial, and the graduation, may be readily varied so as to register a larger number, if desired. If an even number of layers is to be wound upon the spool, the stop $s$, in the side of the dial-case, will be set at such a point that the index will point to the first mark of graduation on the dial, when the latter revolves back to place, after being released from the pawls. But if an uneven number of layers is to be wound, and the first layer is begun at the end of the spool next to the operator, the thread-guide, which was left at the inner end of the last spool wound, must be drawn out to the outer end of the new spool before the winding begins, and in bringing it to this point, the stud will pass the notch in the plate, and the dial will be thus turned the distance of one of the graduated spaces, and will indicate that one layer has been wound upon the spool before the winding has commenced. To obviate any confusion or mistake of the operator from this false indication, the stop $s$ is set, in cases of winding an uneven number of layers, at a lower point in the slot $t$, so that the dial, when released, will stop at a point where the index will point one space back of the first mark of graduation, and when the winding actually commences, the number of layers wound will be correctly indicated.

It will be seen that the counting-attachment described is coactive with the thread-winding machine to which it is applied, and that the operator has only to glance occasionally at the dial to know when the required number of layers has been wound upon the spool, at which time, by drawing the handle I, the plate H is brought forward against the end of the spool, and removes it from the machine, and at the same time the curved plate K will also be brought forward, and press back the arms of the pawl and detent, and release the dial, which will then be free, and will turn back to its position at starting, being arrested at that point by the pin and stop before described. After the spool is dislodged, and the dial restored to place, the handle I is released, and the curved plate K is retracted to its original position by the action of the spring $L'$.

It is well known that for the security of the purchaser of spooled thread or yarn, the number of yards upon each spool is generally stamped upon it, or in some way made evident. In winding the thread from a bobbin upon the spool, the only means which the operative has hitherto had for knowing when the required length has been wound upon the spool in machines of the class described, has been by counting and retaining in the mind the number of successive layers wound, which number, in the work of attending a complicated machine running at high speed, the operator is liable to forget or mistake before the spool is fully wound. In such case the operative may either wind too few layers upon the spool, and thereby defraud the purchaser, and injure the reputation of the manufacturer, or will more probably wind on too many layers, and thus entail a loss upon the manufacturer. In either case, the detriment to a manufacturer using many winding-machines is very considerable, and the actual loss has been found, in many cases, to be heavy, and to obviate it as much as possible frequent measurements of the lengths wound are resorted to without any adequate relief from the liability to loss and damage. By the use of a counting-attachment constructed, applied, and operating substantially as described, the operator, being informed of the number of layers of any given grade of thread necessary to make the required number of yards upon a spool, has only to observe the dial occasionally, and see that the winding stops when the dial indicates that the required number of layers have been wound, thus being freed from the difficult and uncertain task of noting and remembering the number of layers wound, while the manufacturer and the purchaser are equally protected from loss or damage caused by the mistake or forgetfulness of the winder.

What I claim as new in the invention hereinbefore described, and desire to secure by Letters Patent, is—

1. A releasing-plate or tripper, in combination with the spool-removing mechanism of a thread-winding machine, as and for the purpose set forth.

2. The notched adjustable plate $b$, secured to the vibrating-arm, in combination with the traversing-stud $a$, substantially as described.

3. The vibrating-arm $b'$, supporting the pawl $c$, springs $e$ and $e'$, and notched plate $b$, in combination with the revolving dial-plate, detent $m$, and tension-spring $q^2$, substantially as set forth.

4. The combination of the adjustable stop $s$ and pin $q$ with the revolving dial-plate or a revolving index, arranged and operating substantially as and for the purpose specified.

In witness whereof, I have set my hand to the foregoing specification, this eighteenth day of September, A. D. 1867.

WM. GROVER.

Witnesses:
   J. P. BUCKLAND,
   T. A. CURTIS.